US011023669B2

(12) United States Patent
Gross et al.

(10) Patent No.: US 11,023,669 B2
(45) Date of Patent: *Jun. 1, 2021

(54) RENDERING LAMBDA FUNCTIONS IN SPREADSHEET APPLICATIONS

(71) Applicant: Microsoft Technology Licensing, LLC, Redmond, WA (US)

(72) Inventors: Christopher John Gross, Seattle, WA (US); Johnny Campbell, Woodinville, WA (US); Claudio Vittorio Russo, Girton (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,556

(22) Filed: Jun. 29, 2018

(65) Prior Publication Data

US 2020/0004811 A1 Jan. 2, 2020

(51) Int. Cl.
*G06F 40/18* (2020.01)
*G06F 40/103* (2020.01)
*G06F 40/20* (2020.01)
*G06F 8/30* (2018.01)
*G06F 17/17* (2006.01)

(52) U.S. Cl.
CPC .............. *G06F 40/18* (2020.01); *G06F 8/311* (2013.01); *G06F 17/17* (2013.01); *G06F 40/103* (2020.01); *G06F 40/20* (2020.01)

(58) Field of Classification Search
CPC ........ G06F 17/246; G06F 8/311; G06F 17/17; G06F 17/211; G06F 17/27
See application file for complete search history.

(56) References Cited

U.S. PATENT DOCUMENTS

| 5,880,742 A * | 3/1999 | Rao .......................... G06F 40/18 345/440 |
| 2002/0118221 A1* | 8/2002 | Hudson .................... G06F 9/453 715/711 |
| 2003/0056181 A1* | 3/2003 | Marathe .................. G06F 40/18 715/267 |
| 2004/0103366 A1 | 5/2004 | Peyton-jones et al. |

(Continued)

OTHER PUBLICATIONS

"Notice of Allowance Issued in U.S. Appl. No. 16/024,566", dated Jul. 31, 2019, 8 Pages.

(Continued)

*Primary Examiner* — Mandrita Brahmachari

(57) ABSTRACT

Examples discussed herein relate to rending lambdas in spreadsheet application, e.g., Microsoft Excel®. In an implementation, a method of rendering lambdas in a spreadsheet application is disclosed. The method includes accessing a data object corresponding to the lambda function. The data object includes a listing of metadata associated with the lambda function and one or more items of the metadata identify rendering functionality for the lambda function. The method further includes creating a visual representation of the lambda function based, at least in part, on the rendering functionality for the lambda function, and rendering, in the cell of the spreadsheet on a display screen of the computing device, the visual representation of the lambda function.

20 Claims, 11 Drawing Sheets

(56) References Cited

U.S. PATENT DOCUMENTS

| | | | | |
|---|---|---|---|---|
| 2007/0244672 | A1* | 10/2007 | Kjaer | G06F 17/246 703/2 |
| 2009/0276482 | A1 | 11/2009 | Rae et al. | |
| 2009/0319542 | A1* | 12/2009 | Le Brazidec | G06F 17/246 |
| 2010/0261526 | A1 | 10/2010 | Anderson et al. | |
| 2011/0289396 | A1* | 11/2011 | Oh | G06F 17/5009 715/212 |
| 2012/0191642 | A1* | 7/2012 | George | G06F 16/24542 707/602 |
| 2013/0067305 | A1 | 3/2013 | Golan | |
| 2013/0104020 | A1* | 4/2013 | Patterson | G06F 40/18 715/219 |
| 2013/0179764 | A1 | 7/2013 | Battagin et al. | |
| 2015/0309980 | A1* | 10/2015 | Glass | G06F 9/543 715/219 |
| 2017/0084197 | A1 | 3/2017 | Crouse et al. | |
| 2017/0124053 | A1* | 5/2017 | Campbell | G06F 40/106 |
| 2017/0228358 | A1* | 8/2017 | Hirzel | G06F 17/246 |
| 2018/0157468 | A1 | 6/2018 | Stachura | |
| 2018/0295194 | A1* | 10/2018 | Deraz | H04L 67/16 |
| 2020/0004799 | A1 | 1/2020 | Gross et al. | |
| 2020/0004812 | A1 | 1/2020 | Gross et al. | |

OTHER PUBLICATIONS

"Non Final Office Action Issued in U.S. Appl. No. 16/024,598", dated Aug. 19, 2019, 20 Pages.

Cortes, et al., "User-Defined Functions in Spreadsheets", In Masters Thesis Submitted in Software Development IT University of Copenhagen, Sep. 2006, 119 Pages.

"International Search Report and Written Opinion Issued in PCT Application No. PCT/US2019/037833", dated Oct. 2, 2019, 12 Pages.

"International Search Report and Written Opinion Issued in PCT Application No. PCT/US2019/037837", dated Oct. 2, 2019, 12 Pages.

"International Search Report and Written Opinion Issued in PCT Application No. PCT/US2019/037840", dated Oct. 2, 2019, 12 Pages.

Sestoft, Peter, "Online Partial Evaluation of Sheet-Defined Functions", In Electronic Proceeding in Theoretical Computer Science, vol. 129, Sep. 19, 2013, pp. 136-160.

Sestoft, et al., "Sheet-Defined Functions: Implementation and Initial Evaluation", In Proceeding of International Symposium End-User Development, Jun. 10, 2013, pp. 88-103.

"International Search Report and Written Opinion Issued in PCT Application No. PCT/US2019/037412", dated Oct. 28, 2019, 11 Pages.

* cited by examiner

| 305 Lambda Fx | 310 Default Cell Size | 315 Current Rendering | 320 Text Rendering | 325 Name Swap Rendering |
|---|---|---|---|---|
| $f_\lambda$ | | λ | FUNC(x, x+1) | ADD1(x):= x + 1 |

| 330 Text Rendering | 335 Name Swap Rendering |
|---|---|
| FUNC(x,... \| 1/16/1990 | ADD1(x):=... \| 1/16/1990 |

| 340 FN Rendering | 345 FN Rendering (no name) | 350 Compact Rendering | 355 Table Rendering |
|---|---|---|---|
| $f_\lambda$ \| ADD1(x) | $f_\lambda$ \| FUNC(x) | $f_\lambda$ \| 1 arg | $f_\lambda$ \| ADD1(x) |

| 360 FN Rendering | 365 FN Rendering (no name) | 370 Compact Rendering | 375 Table Rendering |
|---|---|---|---|
| $f_\lambda$ \| ADD1(x) \| 1/16/1990 | $f_\lambda$ \| FUNC(x) \| 1/16/1990 | $f_\lambda$ \| 1 arg \| 1/16/1990 | $f_\lambda$ \| ADD1(x) \| 1/16/1990 |

FUNC(year, IF(yea <=2, y  →  DOGYEARS(year):=IF(year
FUNC(yea... | 1/16/1990  →  DOGYEARS... | 1/16/1990

FN Rendering: $f_\lambda$ | DOGYEARS(years) ; $f_\lambda$ | DOGYE... | 1/16/1990
FN Rendering (no name): $f_\lambda$ | FUNC(years) ; $f_\lambda$ | FUNC(... | 1/16/1990
Compact Rendering: $f_\lambda$ | 1 arg ; $f_\lambda$ | 1 arg | 1/16/1990
Table Rendering: $f_\lambda$ | DOGYEARS(years) ; $f_\lambda$ | DOGYEARS(years) | 1/16/1990

FIGURE 3

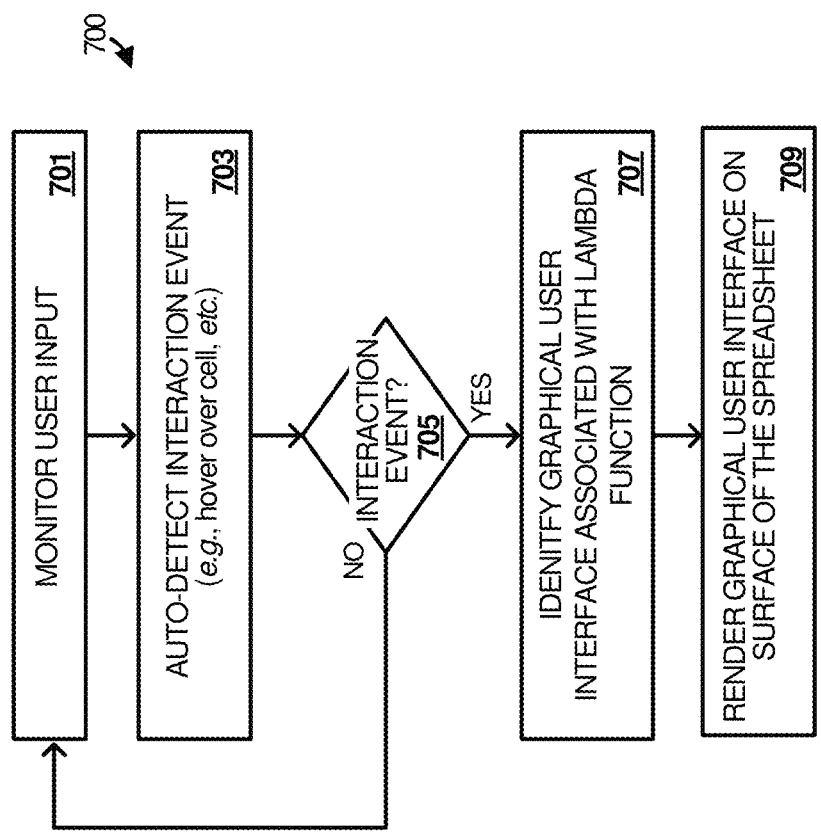

US 11,023,669 B2

RENDERING LAMBDA FUNCTIONS IN SPREADSHEET APPLICATIONS

CROSS REFERENCE TO RELATED APPLICATIONS

This application is related to U.S. patent application Ser. No. 16/024,580, entitled "AUTOMATICALLY CREATING LAMBDA FUNCTIONS IN SPREADSHEET APPLICATIONS," U.S. patent application Ser. No. 16/024,598, entitled "DISTRIBUTION OF LAMBDA FUNCTIONS," and U.S. patent application Ser. No. 16/024,566, entitled "CREATING AND HANDLING LAMBDA FUNCTIONS IN SPREADSHEET APPLICATIONS," all of which were filed on the same day as this application, the contents of which are all expressly incorporated by reference herein.

BACKGROUND

Spreadsheet applications such as, for example, Microsoft Excel®, are widely used in many fields and are increasingly important for analyzing data in today's business and computing environments. For example, data analysts use spreadsheet applications as tools for performing spreadsheet tasks including, but not limited to, consolidating and massaging data, producing charts, performing complex calculations, and the like.

The analysis on data input into spreadsheets is often complex. For example, it is not uncommon for spreadsheets to contain hundreds or thousands of formulae. These spreadsheets often comprise purely-functional programs that lack modularity, rely on copy/paste duplication (of formulae, of whole workbooks), utilize little or no naming, and are otherwise extremely burdensome to create and maintain.

User Defined Functions (UDFs) are supported by many spreadsheet applications and generally address the problems above. Unfortunately, utilizing UDF functionality in today's spreadsheet applications can be extremely complex and time consuming as users must learn at least one programming language, e.g., Visual Basic for Applications (VBA), C++, JavaScript, etc., to code and update the UDFs. Additionally, scalability and cross-platform portability can become an issue due to the lack of native support for UDFs.

Overall, the examples herein of some prior or related systems and their associated limitations are intended to be illustrative and not exclusive. Upon reading the following, other limitations of existing or prior systems will become apparent to those of skill in the art.

BRIEF SUMMARY

Examples discussed herein relate to rending lambdas in spreadsheet application, e.g., Microsoft Excel®. In an implementation, a method of rendering lambdas in a spreadsheet application is disclosed. The method includes accessing a data object corresponding to the lambda function. The data object includes a listing of metadata associated with the lambda function and one or more items of the metadata identify rendering functionality for the lambda function. The method further includes creating a visual representation of the lambda function based, at least in part, on the rendering functionality for the lambda function, and rendering, in the cell of the spreadsheet on a display screen of a computing device, the visual representation of the lambda function.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 3 depicts example lambda function cell renderings, according to some implementations.

FIG. 7 depicts flow diagram illustrating example operations for rendering visual representations of a lambda function in a spreadsheet, according to some implementations.

DETAILED DESCRIPTION

Technology is disclosed herein for rendering lambdas (or lambda functions) in spreadsheet applications. As discussed herein, lambdas are user (or custom) defined functions (UDFs) that are natively creatable within a cell of a spreadsheet and maintainable within a spreadsheet application using a lambda registry. The function syntax can have one or more arguments including one or more optional parameters followed by a function definition (also referred to as the function body or formula). Once defined, a lambda function can be invoked, and the formula applied like other first-class functions.

In some implementations, the spreadsheet application can detect expressions that define a lambda function, register the lambda function with the lambda registry, and replace a representation of the expression with a representation of a reference to the registered lambda function. The registration can include recording a number of fields including a home cell that identifies a location of the spreadsheet where the lambda function is defined. Other fields can include identifier (ID), Name, function body (or formula), etc. One or more lambda registries can be created and associated with workbooks (or spreadsheet files). As discussed herein, each workbook (or spreadsheet file) includes one or more sheets (or spreadsheet grids). The lambda functions can be invoked by referencing a name of the lambda function or, in some instances, the home cell of the lambda function.

In some implementations, the spreadsheet application accesses rendering functionality associated with the lambda function and creates a visual representation of the lambda function based, at least in part, on the rendering functionality for the lambda function. The spreadsheet application can then render the visual representation of the lambda function in the cell of the spreadsheet where the lambda function is defined.

Various technical effects are enabled by the techniques discussed herein. For example, the techniques enable users to more easily create and define lambdas (or lambda functions) within a spreadsheet application using spreadsheet formula syntax (or language). Moreover, because lambdas are functions which can act like data, the lambda functions enable recursion within a spreadsheet application, e.g., by the function calling itself. In addition to the clear ease of use and functional improvements to spreadsheet applications, native support for the lambda functions can also improve scalability and portability of these spreadsheets that utilize UDFs.

Figure 1A:
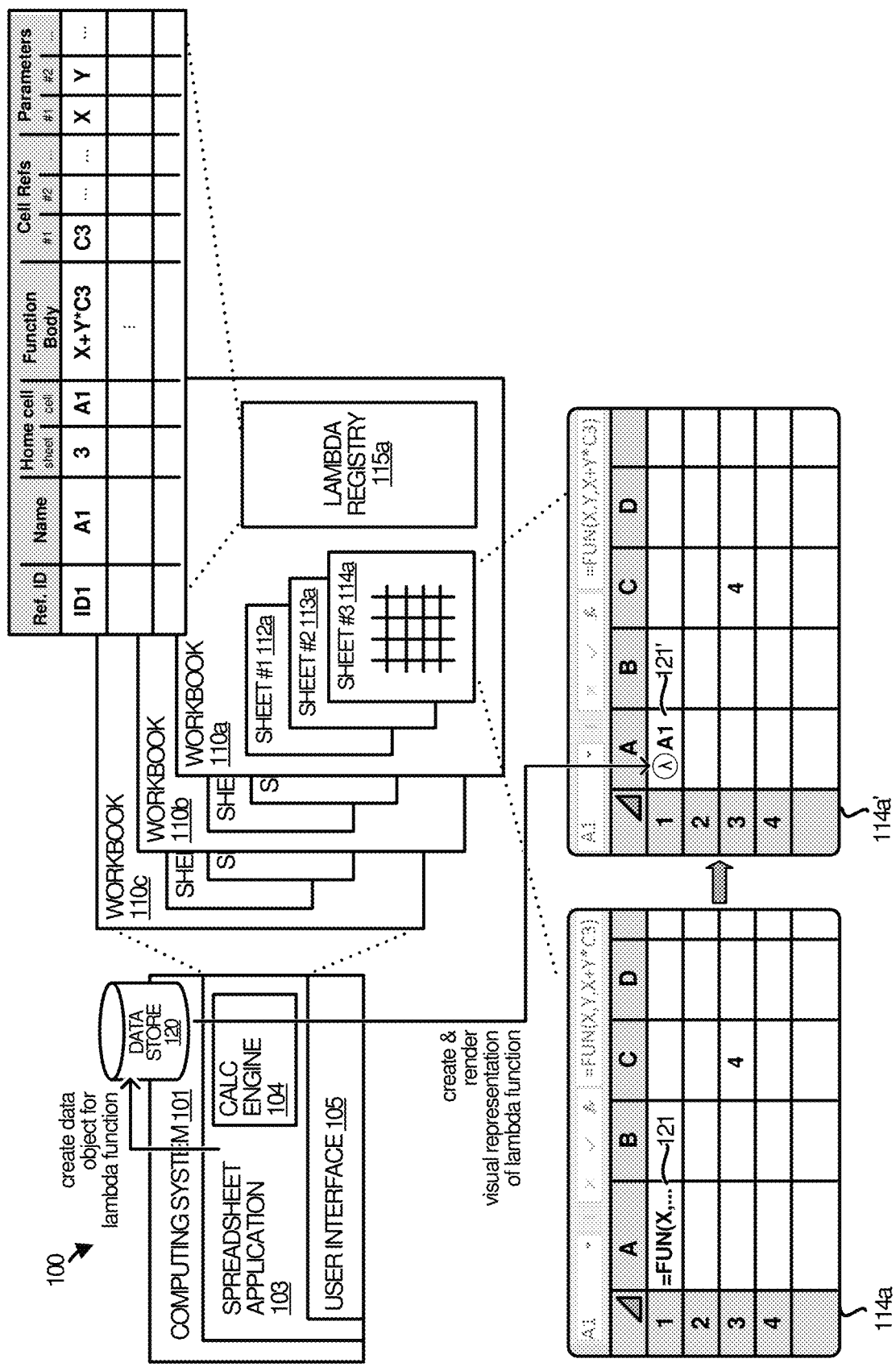
FIGS. 1A and 1B depict block diagrams illustrating an example operational architecture for creating and handling lambda functions in spreadsheet applications, according to some implementations.
Figure 1B:
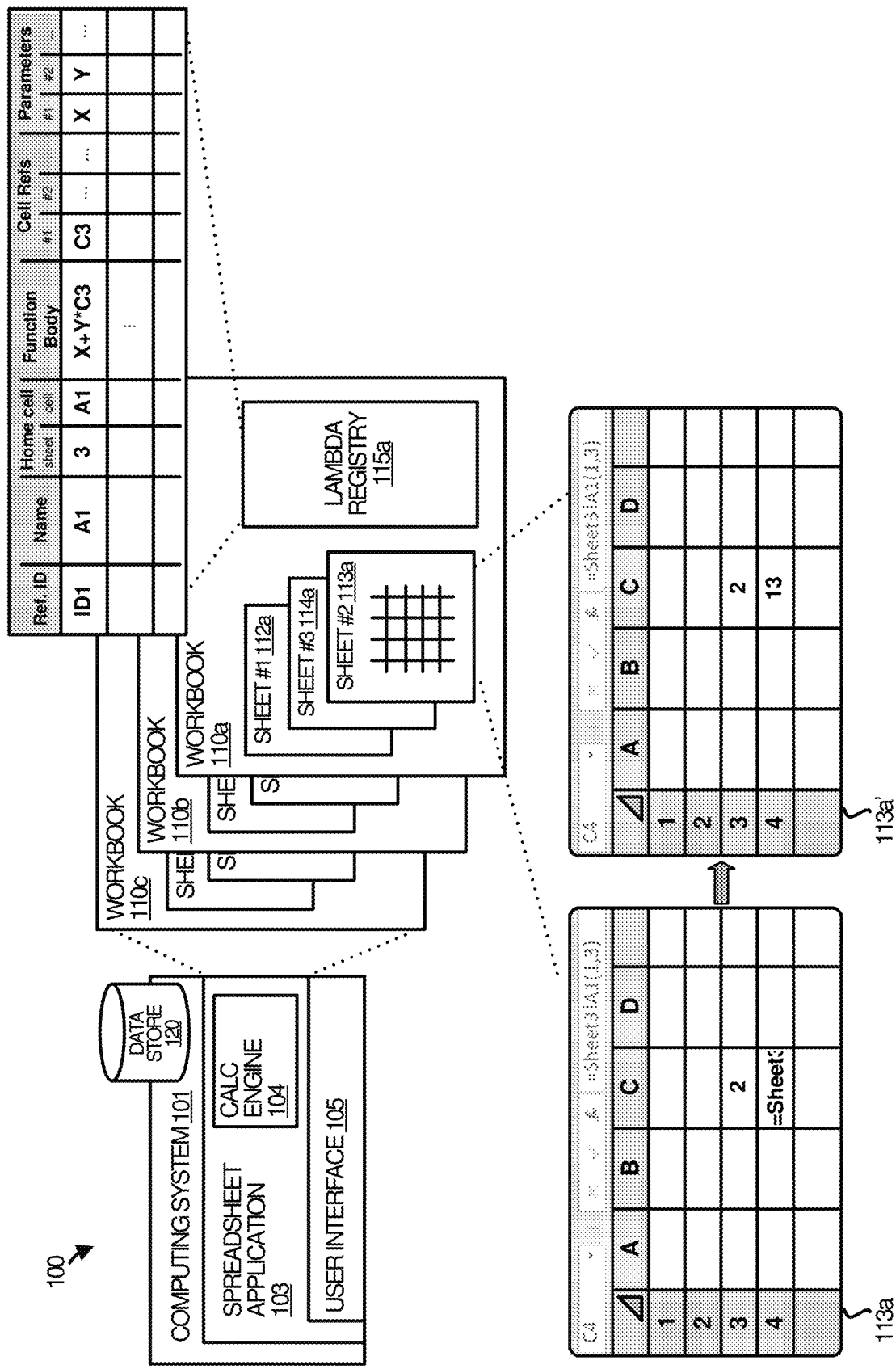

FIGS. 1A and 1B depict a block diagram illustrating an example operational architecture 100 for creating and handling lambda functions in spreadsheet applications, according to some implementations. The operational architecture 100 includes a computing system 101 on which a spreadsheet application 103 may be implemented and a data store 120 on which the spreadsheet application 103 and data contained therein is stored.

Figure 8:
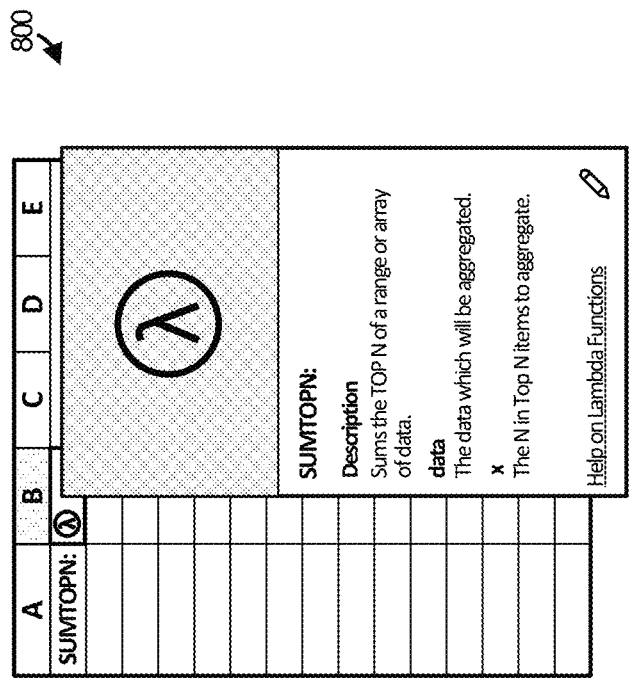
FIG. 8 depicts an example illustrating a lambda card that can be rendered on the surface of a spreadsheet by a spreadsheet application, according to some implementations.

The spreadsheet application 103 can include functionality including GUIs (graphical user interface) running on computing system 101, e.g., a PC, mobile phone device, a Web server, or other application servers. Such systems may employ one or more virtual machines, containers, or any other type of virtual computing resource in the context of supporting remote micro-services as native functions within the spreadsheet application 103 of which the computing system 801 of FIG. 8 is representative. The spreadsheet application 103 includes a calculation engine 104 which can assist with driving a user interface 105 to the spreadsheet application 103.

The spreadsheet application 103 can include multiple workbooks, e.g., workbooks 110a-110c. Additional or fewer workbooks are possible. Each workbook can include one or more sheets and a lambda registry. As shown in the example of FIGS. 1A and 1B, workbook 110a includes sheet #1 112a, sheet #2 113a, and sheet #3 114a, and an associated or corresponding lambda registry 115a. Three worksheets are shown for simplicity, each workbook can include additional or fewer sheets. Additionally, while each workbook, e.g., spreadsheet file, is shown as having an associated or corresponding lambda registry, it is appreciated that in some implementations, additional or fewer lambda registries can be utilized. For example, a single registry could be used across multiple workbooks or multiple lambda registries could be associated or corresponding to a single workbook. In some implementations, a registry list is also maintained that identifies workbooks and related or corresponding registries. An example is shown and discussed in greater detail with reference to FIG. 2.

As shown in the examples of FIGS. 1A and 1B, the lambda registry contains various fields including a reference identifier (ID) field, a Name field, a Home Cell field, one or more cell reference fields, and one or more parameter fields. Additional or fewer fields are possible. In some implementations, lambda function syntax is defined in the spreadsheet application which allows users to create and store the lambda functions within a cell of the spreadsheet.

In one example of operation, one or more components of spreadsheet application 103 detect that cell A1 of sheet 114a is populated with an expression that defines a lambda function, e.g., =FUN(X1, . . . Xn, F), where X1-Xn are parameters and F is a function body (or formula) that evaluates into a function value. Although the application primarily discusses inputting an expression via user input, it is appreciated that the expression that defines the lambda function can be input into the cell of the sheet 114a in any number of ways e.g., via user input, programmatic input, etc. The function body F can reference (or refer to) one or more cells of the spreadsheet. As shown in the example of FIGS. 1A and 1B, the expression 121 defines a lambda function having a body F represented by the formula 'X+Y*C3'.

One or more components of the spreadsheet application can register the lambda function with the lambda registry 115a. The registration includes recording a home cell. The home cell identifies a location of the cell of the spreadsheet where the lambda function is defined. In some implementations, the location indicates a sheet and cell within a workbook. As shown in the example of FIGS. 1A and 1B, the home cell is Sheet #3 114a, cell A1 of workbook 110a.

The lambda registration process can include determining various other names, parameters and/or values and recording those names, parameters and/or values with the lambda registry 115a. For example, the body F represented by the formula 'X+Y*C3' refers to a cell C3. In the example of FIGS. 1A and 1B, the registration includes recording the cell name and/or location, e.g., cell C3. In some implementations, a direct reference to the cell in the spreadsheet can be recorded. As shown in the example of FIGS. 1A and 1B, the parameters X and Y can also be recorded in the lambda registry.

In some implementations, the registration process includes generating a data object corresponding to the lambda function. As discussed herein, the data object can include a listing of metadata associated with the lambda function including, but not limited to, metadata that identifies rendering functionality associated with the lambda function. The rendering functionality can include metadata identifying visual representations of the lambda function for rendering in a cell of a spreadsheet, e.g., the cell where the lambda function is defined, as well as information for generating graphical user interfaces for surfacing additional information related to the lambda function or allowing a user to modify or visualize properties or characteristics of the lambda function.

Once the lambda function is registered with the lambda registry 115a and stored in cell A1, the rendering of the expression 121 that defines the lambda function can be replaced with a rendering of a reference to the registered lambda function 121'. The rendering, within the cell, can include an indication that the cell contains a lambda function. Various representations (graphical or otherwise) of the registered lambda function are possible. As shown in the example of FIGS. 1A and 1B, the registered lambda function is represented by a graphical representation of an encircled lambda symbol $\lambda$ followed by the cell location (or home cell) A1.

Referring next to FIG. 1B, one or more components of spreadsheet application 103 then identify and/or otherwise detect that cell C4 of sheet #2 113a is populated with an expression (or formula) that invokes the lambda function A1( ) from Sheet 3 114a. More specifically, the expression invokes the lambda function Sheet3!A1(1,3), where 1 and 3 are arguments corresponding to parameters X and Y. Responsive to the invocation, the one or more components of spreadsheet application 103 consult the lambda registry 115a to identify the body (or formula) of the lambda function, e.g., F=X+Y*C3, determine a value for cell C3 relative to the home cell, e.g., cell A1 sheet 3, and calculate an output value of the lambda function.

As shown in the example of FIG. 1B, the output value of the lambda function is calculated as follows:

Sheet3!$A$1:=FUN($X,Y,X+Y*C3$)

Sheet3!$C$3:4

Sheet2!$C$3:2

Sheet2!$C$4$:=Sheet3!$A$1(1,3)=Sheet3!$A$1(1+ 3*Sheet3!$C$3)=1+3*4=13

Although not shown in the example of FIGS. 1A and 1B, because lambdas are functions which can act like data, the lambda functions enable recursion within a spreadsheet application, e.g., by the function calling itself. For example, A1:=FUNCTION(x, IF(x<10, A1(x+1), x)) describes a lambda function that will iterate until the value 10 is reached.

Figure 2A:
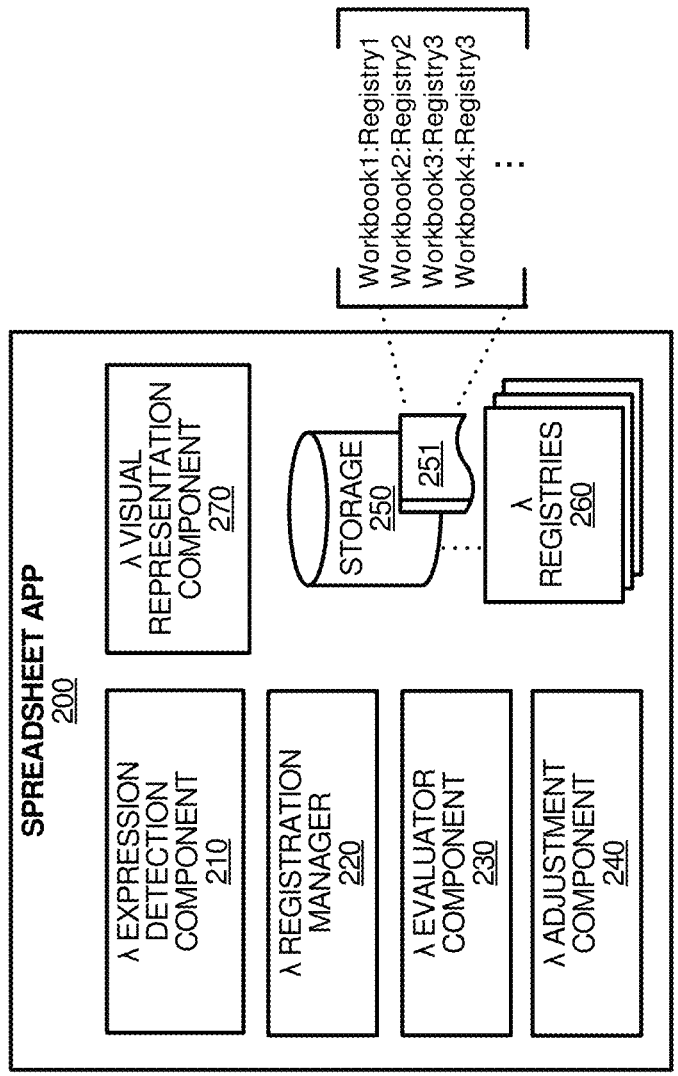
FIG. 2A depicts example components of a spreadsheet application, according to some implementations.

FIG. 2A depicts example components of a spreadsheet application 200, according to some implementations. The spreadsheet application 200 can be spreadsheet application 103 of FIGS. 1A and 1B, although alternative configurations are possible. The functions represented by the components, modules, managers and/or engines described with reference to FIG. 2A can be implemented individually or in any combination thereof, partially or wholly, in hardware, software, or a combination of hardware and software. Additionally, although illustrated as discrete components, the operation and functionality of the components, modules, managers and/or engines described with reference to FIG. 2A can be integrated anywhere within the spreadsheet application 200 including, but not limited to, the calculation engine 104.

As illustrated in the example of FIG. 2A, the spreadsheet application 200 includes a $\lambda$ expression detection component 210, a $\lambda$ registration manager 220, a $\lambda$ evaluator component 230, a $\lambda$ adjustment component 240, a storage container 250, and a $\lambda$ visual representation component 270. Other systems, databases, and/or components are also possible. Various components can also be omitted in some implementations.

The $\lambda$ expression detection component 210 is configured to detect that a cell of a spreadsheet is populated with an expression that defines a lambda function. As discussed above, in some implementations, lambda function syntax is defined in the spreadsheet application which allows users to create and store the lambda functions within a cell of the spreadsheet. The $\lambda$ expression detection component 210 can detect these expressions.

The $\lambda$ registration manager 220 is configured to register the lambda function with a lambda registry corresponding to the spreadsheet. As discussed herein, each workbook, e.g., spreadsheet file, can include an associated or corresponding lambda registry. In some implementations, a single registry can be used across multiple workbooks or multiple lambda registries could be associated with or correspond to a single workbook. As shown in the example, of FIG. 2A, storage container 250 includes a registry list 251 that identifies workbooks and related or corresponding registries.

The $\lambda$ evaluator 230 is configured to evaluate formulas included in the body of lambda functions when the lambda function is invoked. In some implementations, the $\lambda$ evaluator component 230 calculates an output value of the lambda function using the formula and arguments and stores the output value in the cell from which the lambda was invoked.

The $\lambda$ adjustment component 240 is configured to detect cell adjustment events and responsively access the lambda registry to identify one or more cells referenced by a body of the lambda function that are affected by the cell adjustment event. The $\lambda$ adjustment component 240 then modifies the one or more cells referenced by the body of the lambda function to account for the adjustment to the one or more cell locations. An example illustrating cell adjustment is shown and discussed in greater detail with reference to FIG. 7.

The storage container 250 includes a registry list 251 and $\lambda$ registries 260. The storage container 250 can be data store 120 of FIGS. 1A and 1B, although alternative configurations are possible. Likewise, $\lambda$ registries 260 can be lambda registries 115a-115c of FIGS. 1A and 1B, although alternative configurations are possible.

The $\lambda$ visual representation component 270 is configured to create and render visual representations of lambda functions and graphical user interfaces that allow users to visualize, create and modify lambda functions. As discussed herein, the registration process includes generating a data object corresponding to the lambda function that includes a listing of metadata associated with the lambda function. The metadata can include various metadata items related to the lambda function. For example, the metadata can include at least one of a code comments field, a lambda function name field, a lambda function tooltip field, or an arguments comments field. The tooltip or infotip (or a hint) is a graphical user interface element that can be used in conjunction with a cursor, usually a pointer. For example, if a user hovers the pointer over an item, without clicking it, a tooltip may appear—a small "hover box" with information about the item being hovered over.

The metadata can also include information related to rendering functionality including metadata identifying visual representations of the lambda function for rendering in a cell of a spreadsheet, e.g., the cell where the lambda function is defined, as well as information for generating graphical user interfaces for surfacing additional information related to the lambda function or allowing a user to modify or visualize properties or characteristics of the lambda function. An example λ visual representation component is shown and discussed in greater detail with reference to FIG. 2B.

Figure 2B:
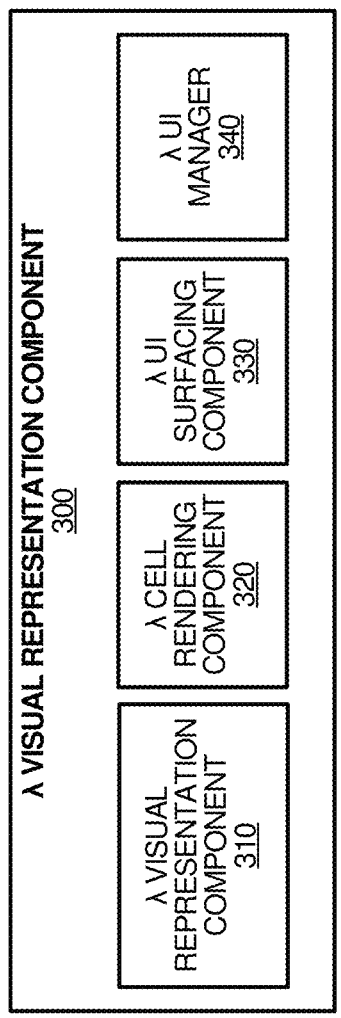
FIG. 2B depicts example components of a λ visual representation component 300, according to some implementations.

FIG. 2B depicts example components of a λ visual representation component 300, according to some implementations. The λ visual representation component 300 can be λ visual representation component 270 of FIG. 2A, although alternative configurations are possible. As illustrated in the example of FIG. 2A, the spreadsheet application 200 includes a λ visual representation component 310, a λ cell rendering component 320, a λ UI surfacing component 330, and a λ UI manager 340. Other systems, databases, and/or components are also possible. Various components can also be omitted in some implementations.

The λ visual representation component 310 is configured to access data objects corresponding to lambda functions and the metadata identify rendering functionality for the lambda function.

The λ cell rendering component 320 is configured to create and render visual representations of lambda functions in cells of the spreadsheet. More specifically, the visual representations are rendered on a display screen of a computing device that is executing a spreadsheet application. As discussed herein, the visual representations of the lambda functions are created based, at least in part, on the rendering functionality for the lambda function. Examples of visual representations of the lambda functions are shown and discussed in greater detail with reference to FIG. 3.

The λ UI surfacing component 330 is configured to create and render visual representations of lambda functions and/or graphical user interfaces on the surface of the spreadsheet. More specifically, the visual representations are rendered on a display screen of a computing device that is executing a spreadsheet application. As discussed herein, the visual representations of the lambda functions are created based, at least in part, on the rendering functionality for the lambda function. Example graphical user interfaces are shown and discussed in greater detail with reference to FIGS. 5, 6A-6B, and 8.

The λ UI manager 340 is configured to monitor user interaction with the spreadsheet application and, in some implementations, receive input from the graphical user interfaces for generating and/or modifying metadata associated with a lambda function.

FIG. 3 depicts example lambda function cell renderings 300, according to some implementations. As discussed herein, one or more components of a spreadsheet application such as, for example, spreadsheet application 103 of FIGS. 1A and 1B, or one or more processors, extensions, modules, engines, components or tools associated therewith, can create a visual representation of a lambda function and, responsive to registering the lambda function, render the visual representation of the lambda function in a cell of the spreadsheet, e.g., the cell of the spreadsheet where the lambda function is defined. Alternative configurations are also possible.

Rendering 305 illustrates an example indication that a cell includes a lambda function. This rendering can be included in various of the example cell renderings. Rendering 130 illustrates an example default cell size. As shown in the example of FIG. 3, various cell renderings 315-375 are possible. It is appreciated that the example renderings 315-375 are non-exhaustive, additional cell renderings are possible.

Figure 4:
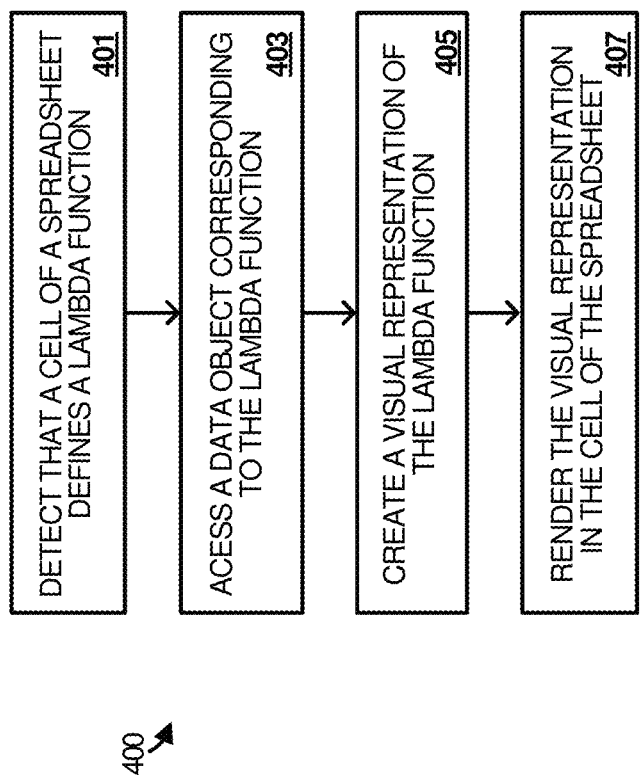
FIG. 4 depicts flow diagram illustrating example operations for creating a visual representation of a lambda function and rendering the visual representation in a cell of a spreadsheet, according to some implementations.

FIG. 4 depicts flow diagram 400 illustrating example operations for creating a visual representation of a lambda function and rendering the visual representation in a cell of a spreadsheet, according to some implementations. The example operations may be performed in various implementations by one or more components of a spreadsheet application such as, for example, spreadsheet application 103 of FIGS. 1A and 1B, or one or more processors, extensions, modules, engines, components or tools associated therewith. Alternative configurations are also possible.

To begin, at 401, the spreadsheet application detects that a cell of a spreadsheet defines a lambda function. At 403, the spreadsheet application accesses a data object corresponding to the lambda function. As discussed herein, the data object includes a listing of metadata associated with the lambda function and one or more items of the metadata identify rendering functionality for the lambda function.

At 405, the spreadsheet application creates a visual representation of the lambda function based, at least in part, on the rendering functionality for the lambda function. In some implementations, the visual representation includes an indication that the cell of the spreadsheet defines the lambda function. For example, notation $f_\lambda$ or λ can be used. Alternatively, or additionally, text descriptors such as "FUN" or "FUNC", or the name of the function can be used as an indication that the cell defines a lambda function. Lastly, at 407, the spreadsheet application renders, in the cell of the spreadsheet on a display screen of the computing device, the visual representation of the lambda function.

Figure 5:
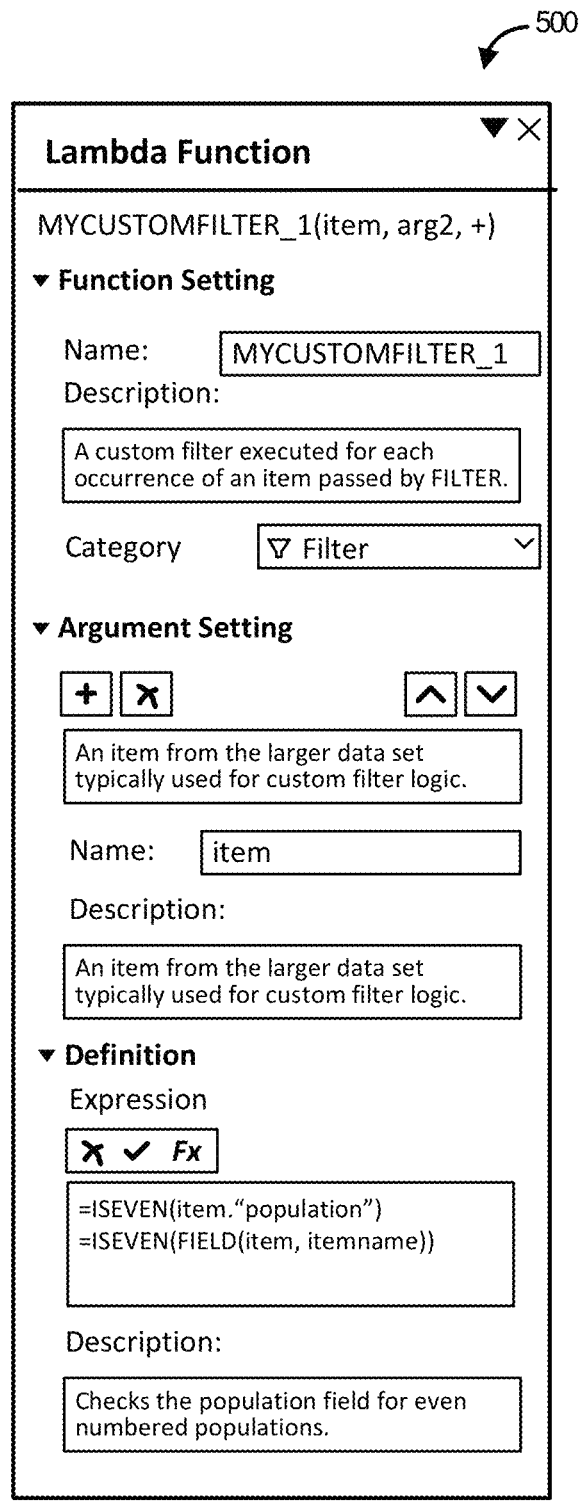
FIG. 5 depicts an example graphical user interface that can be rendered on the surface of a spreadsheet by a spreadsheet application for defining (or modifying) a lambda function, according to some implementations.

FIG. 5 depicts an example graphical user interface 500 that can be rendered on the surface of a spreadsheet by a spreadsheet application for defining (or modifying) a lambda function, according to some implementations. The spreadsheet application can be, for example, spreadsheet application 103 of FIGS. 1A and 1B, or one or more processors, extensions, modules, engines, components or tools associated therewith. Alternative configurations are also possible.

As discussed herein, a user can trigger the graphical user interface 500 for defining (or modifying) a lambda function in any number of ways. For example, a user can create a custom function, i.e., launch graphical user interface 500 manually from a menu of the spreadsheet application. Alternatively, or additionally, the graphical user interface 500 can be triggered based on a user's interaction with the spreadsheet. For example, if a user starts typing functional lambda notation, "e.g., =FUN( . . . ", the graphical user interface 500 can be rendered automatically by the spreadsheet application.

Figure 6B:
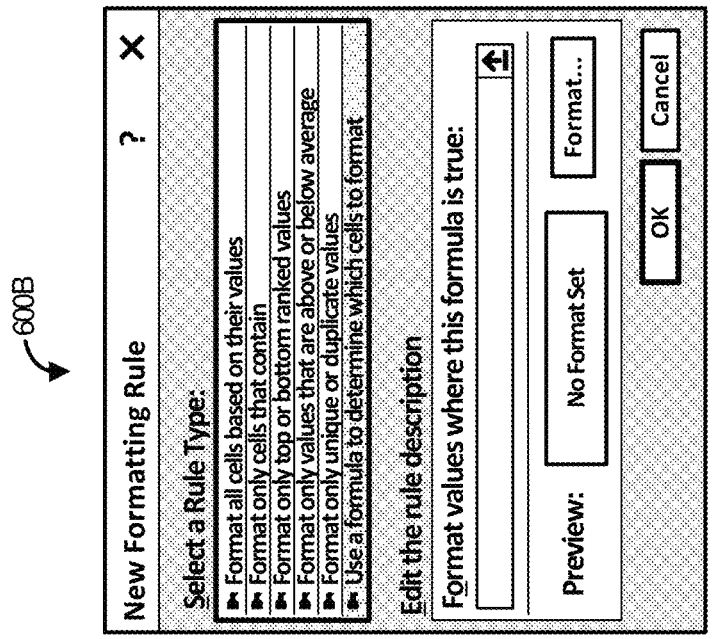
FIGS. 6A and 6B depict example graphical user interfaces that can be rendered on the surface of a spreadsheet by a spreadsheet application for defining, visualizing and/or modifying a lambda function, according to some implementations.
Figure 6A:
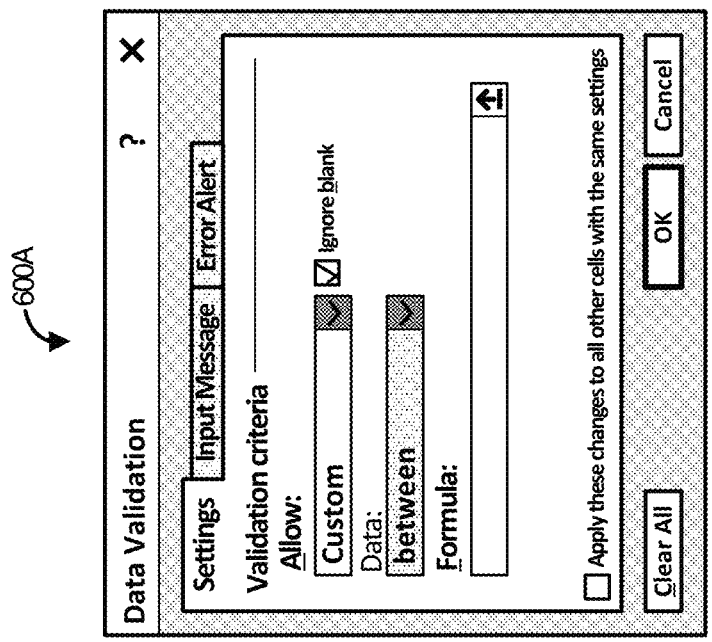

FIGS. 6A and 6B depict example graphical user interfaces 600A and 600B that can be rendered on the surface of a spreadsheet by a spreadsheet application for defining, visualizing and/or modifying a lambda function, according to some implementations. More specifically, the example graphical user interfaces 600A and 600B illustrate graphical user interfaces for defining validation and custom formatting, respectively, according to some implementations. The spreadsheet application can be, for example, spreadsheet application 103 of FIGS. 1A and 1B, or one or more processors, extensions, modules, engines, components or tools associated therewith. Alternative configurations are also possible.

Referring first to the example of FIG. 6A, graphical user interface 600A can be rendered on the surface of a spreadsheet to define validation criteria. For example, a user of the spreadsheet can use a formula to automatically create a lambda function (using implied lambda notation similar to the FILTER implied lambda which must return TRUE or FALSE) to determine whether a given data is valid. The graphical user interface 600A can be launched manually or based on some user input or series of user inputs.

Likewise, graphical user interface 600B can be rendered on the surface of a spreadsheet to define custom formatting, e.g., defining a new formatting rule.

FIG. 7 depicts flow diagram 700 illustrating example operations for rendering visual representations of a lambda function in a spreadsheet, according to some implementations. The example operations may be performed in various implementations by one or more components of a spreadsheet application such as, for example, spreadsheet application 103 of FIGS. 1A and 1B, or one or more processors, extensions, modules, engines, components or tools associated therewith. Alternative configurations are also possible.

To begin, at 701, the spreadsheet application monitors user input or user interaction with a spreadsheet and, at 703, determines if an interaction event is detected. An interaction event can be, for example, an indication that a user is hovering a cursor or pointers over a particular cell, double clicking a cell (or a corner of the cell), or otherwise interacting with a spreadsheet in a manner indicative of potentially needing more information. If the spreadsheet application detects the interaction event at decision 705, then at 707, the spreadsheet applications identifies a graphical user interface associated with the lambda function. For example, based on a particular input, the spreadsheet application can access metadata associated with that interaction event.

Lastly, at 709, the spreadsheet application renders the graphical user interface on the surface of the spreadsheet. In one example of operation, a particular interaction can cause the spreadsheet application to render a particular graphical user interface element, e.g., tooltip or infotip, on the surface of the spreadsheet. For example, if a user hovers the pointer over a cell containing a lambda function, without clicking it, and a tooltip may appear—a small "hover box" with information about the item being hovered over.

FIG. 8 depicts an example 800 illustrates a lambda card 820 that can be rendered on the surface of a spreadsheet 810 by a spreadsheet application, according to some implementations. As discussed herein, when a lambda function is created a data object corresponding to the data object is created. The data object includes metadata associated with the lambda function. The metadata can identify rendering functionality for the lambda function. For example, occurrence of a particular interaction event can trigger rendering of the lambda card 820 on the surface of the spreadsheet. The lambda card (as well as other graphical user interfaces discussed herein) can illustrate metadata specific to an invocation of a lambda function as well as general metadata associated with the definition of a lambda function.

Although not shown, in some implementations, the lambda card 820 (as well as other graphical user interfaces discussed herein) also allows users to input and/or modify or manage the metadata.

Figure 9:
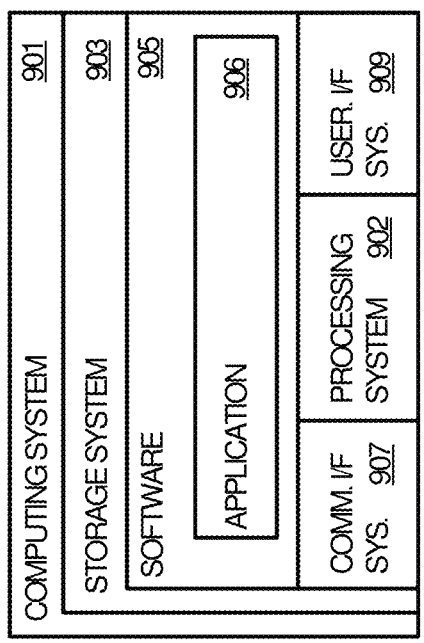
FIG. 9 is a block diagram illustrating a computing system suitable for implementing the technology disclosed herein, including any of the applications, architectures, elements.

FIG. 9 depicts a computing system 901, which is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909 (optional).

Processing system 902 loads and executes software 905 from storage system 903. Software 905 includes various processes, which are generally representative of the processes discussed with respect to the preceding Figures and additional examples below. When executed by processing system 902, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include the processes discussed herein. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system for handling approximate values in spreadsheet applications. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The techniques discussed herein can be embodied as special-purpose hardware (e.g., circuitry), as programmable circuitry appropriately programmed with software and/or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiment shown," "in other embodiments," "in some implementations," "according to some implementations," "in the implementation shown," "in other implementations," and the like generally mean the particular feature, structure, or characteristic following the phrase is included in at least one embodiment or implementation of the present technology and may be included in more than one embodiment or implementation. In addition, such phrases do not necessarily refer to the same or different embodiments or implementations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
   computer readable storage media;
   program instructions stored on the computer readable storage media including a spreadsheet application, wherein the program instructions, when executed by a processing system of a computing device, direct the processing system to:
   receive user input into a cell of a spreadsheet, wherein the user input comprises a formula that includes: a text descriptor that identifies the formula as a lambda function, and an expression that defines the lambda function and includes parameters of the lambda function and a body of the lambda function;
   in response to the user input, generate a data object corresponding to the lambda function, wherein the data object includes a listing of metadata associated with the lambda function, and wherein the metadata identifies a cell rendering for the lambda function;
   create a visual representation of the lambda function based, at least in part, on the cell rendering for the lambda function; and
   replace the formula with the visual representation of the lambda function in the cell of the spreadsheet.

2. The apparatus of claim 1, wherein the visual representation includes an indication that the cell of the spreadsheet includes the expression that defines the lambda function.

3. The apparatus of claim 1, wherein the metadata comprises one or more fields including at least one of a code comments field, a lambda function name field, a lambda function tooltip field, and an arguments comments field.

4. The apparatus of claim 1, wherein:
   the visual representation of the lambda function includes at least one symbol indicating that the cell includes the lambda function; and
   replacing the formula with the visual representation of the lambda function includes enabling display of the at least one symbol.

5. The apparatus of claim 1, wherein:
   the visual representation of the lambda function includes a graphical representation indicating that the cell includes the lambda function; and
   replacing the formula with the visual representation of the lambda function includes enabling display of the graphical representation.

6. The apparatus of claim 1, wherein the program instructions, when executed by the processing system, direct the processing system to:
   monitor user interaction with the spreadsheet;
   detect an interaction event related to the cell of the spreadsheet based on the user interaction with the spreadsheet; and
   responsively identify and render a graphical user interface on a top layer or surface of the spreadsheet.

7. The apparatus of claim 6, wherein the visual representation comprises one or more interface elements.

8. The apparatus of claim 7, wherein each interface element of the one or more interface elements corresponds to at least one item of the metadata.

9. The apparatus of claim 6, wherein the interaction event comprises a card surfacing event and the graphical user interface comprises a card.

10. The apparatus of claim 6, wherein the interaction event comprises a cursor event and the graphical user interface comprises a tooltip or infotip.

11. The apparatus of claim 6, wherein the program instructions, when executed by the processing system, further direct the processing system to:
    detect input via the graphical user interface indicating a modification to the metadata associated with the lambda function; and
    responsively adjust the metadata associated with the lambda function.

12. The apparatus of claim 1, wherein the program instructions, when executed by the processing system, further direct the processing system to create the data object when registering the lambda function with a lambda registry.

13. A method comprising:
    receiving user input into a cell of a spreadsheet, wherein the user input comprises a formula that includes: a text descriptor that identifies the formula as a lambda function, and an expression that defines the lambda function and includes parameters of the lambda function and a body of the lambda function;
    in response to the user input, generate a data object corresponding to the lambda function, wherein the data object includes a listing of metadata associated with the lambda function, and wherein an item of the metadata identifies a cell rendering for the lambda function;
    creating a visual representation of the lambda function based, at least in part, on the cell rendering; and
    in the cell of the spreadsheet, replace the formula with the visual representation of the lambda function.

14. The method of claim 13, wherein the lambda function is maintainable within a spreadsheet application associated with the spreadsheet via a lambda registry.

15. The method of claim 13, wherein the visual representation includes an indication that the expression in the cell of the spreadsheet defines the lambda function.

16. The method of claim 13, wherein:

the visual representation of the lambda function includes a graphical representation indicating that the cell includes the lambda function; and replacing the formula with the visual representation of the lambda function includes enabling display of the graphical representation.

17. The method of claim 13, further comprising:

monitoring user interaction with the spreadsheet;

detecting an interaction event related to one or more cells of the spreadsheet based on the user interaction with the spreadsheet; and responsively identifying and rendering a graphical user interface on a surface of the spreadsheet.

18. The method of claim 17, wherein the visual representation comprises one or more interface elements, and wherein each interface element corresponds to at least one item of metadata.

19. The method of claim 17, further comprising:

receiving input via the graphical user interface indicating a modification to [[the]] one or more items of the metadata associated with the lambda function; and responsively adjusting the one or more items of the metadata associated with the lambda function.

20. An apparatus comprising:

one or more processing systems;

one or more computer readable storage media storing:

at least one lambda registry data structure; and program instructions including one or more components of a spreadsheet application, wherein the program instructions, when executed by the one or more processing systems, direct the one or more processing systems to:

that receive user input into a cell of a spreadsheet, wherein the user input comprises a formula that includes: a text descriptor that identifies the formula as a lambda function, and an expression that defines the lambda function and includes parameters of the lambda function and a body of the lambda function;

access in response to the user input, generate a data object corresponding to the lambda function, wherein the data object includes a listing of metadata associated with the lambda function, and wherein one or more items of the metadata identify a cell rendering for the lambda function;

create a visual representation of the lambda function based, at least in part, on the cell rendering for the lambda function; and replace the formula with the visual representation of the lambda function in the cell of the spreadsheet.

* * * * *